July 15, 1947.  H. A. STRICKLAND, JR  2,424,197
CONNECTOR BLOCK
Filed Jan. 2, 1943  2 Sheets-Sheet 1
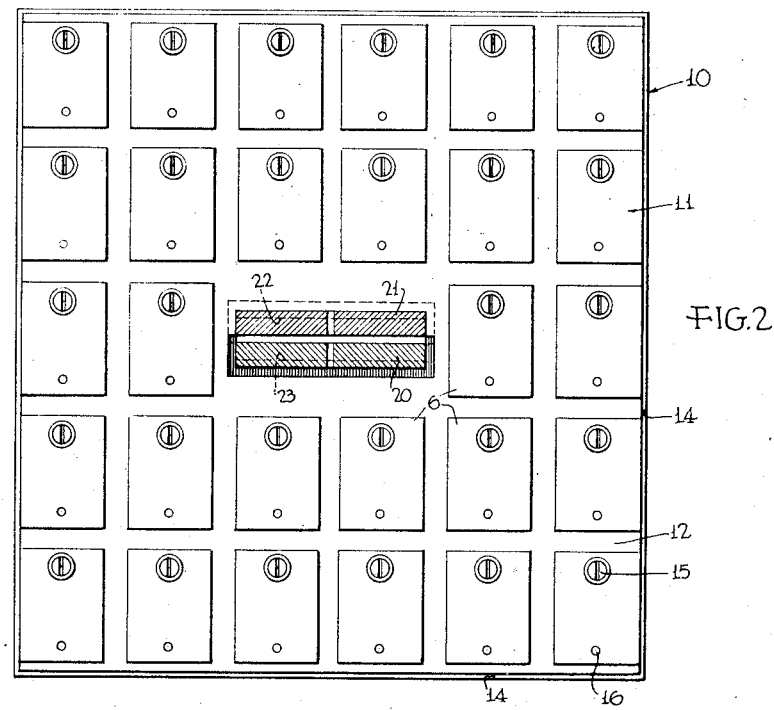
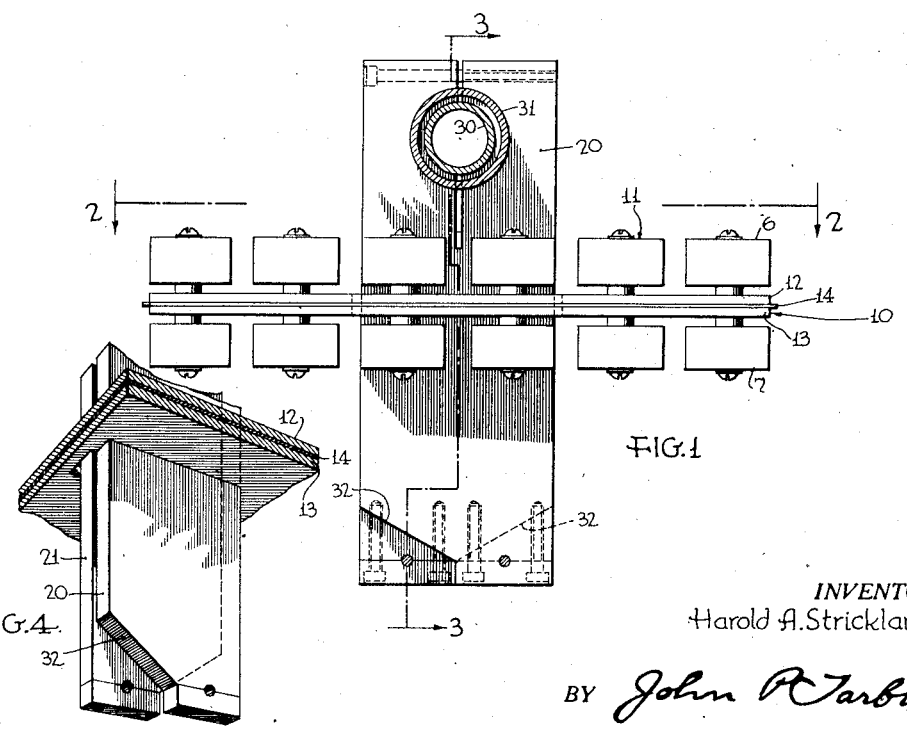
*INVENTOR*
Harold A. Strickland Jr.
BY John P. Tarbox
*ATTORNEY*

July 15, 1947.　　H. A. STRICKLAND, JR　　2,424,197
CONNECTOR BLOCK
Filed Jan. 2, 1943　　2 Sheets-Sheet 2

INVENTOR
Harold A. Strickland Jr.
BY John P. Tarbox
ATTORNEY

Patented July 15, 1947

2,424,197

UNITED STATES PATENT OFFICE 2,424,197

CONNECTOR BLOCK

Harold A. Strickland, Jr., Detroit, Mich., assignor, by mesne assignments, to The Budd Company, Philadelphia, Pa., a corporation of Pennsylvania Application January 2, 1943, Serial No. 471,191

1 Claim. (Cl. 173—324)

This invention relates to electrical apparatus including capacitors and particularly to a capacitor block adapted for use in connection with high frequency currents.

In many electrical circuits, particularly in high frequency circuits, it is of considerable importance that the resistance and inductance be reduced to as small a value as possible.

It is accordingly one of the primary objects of the invention to provide a circuit arrangement and electrical unit support having a minimum of inductance and resistance when utilized in a high frequency circuit. Another object of the invention is to provide a capacitor block in which the various capacitors are directly connected to the adjacent bus conductors to provide a rigid and unified capacitor bank. Still another object is to provide a capacitor block which lends itself readily to parallel association with the individual capacitor units. An object of the invention, also, is to provide a capacitor block in which the reactance of the conductors intermediate the various capacitor units is reduced to an extremely small value.

Further objects of the invention are included in the provision of means in a capacitor block for increasing the rate of heat dissipation over prior construction; for simplifying the method of applying heat dissipating means; and for, in general, improving the details of construction of capacitor blocks of the type described.

The manner in which the foregoing and related objects are achieved will appear on consideration of the following description of an illustrative embodiment of the invention taken in conection with the accompanying drawings, in which Figure 1 is an edge view of the capacitor block;

Figure 2 is a plan view partly in section showing the associated capacitor elements;

Figure 4 is a perspective of the block unit.

Figure 3:
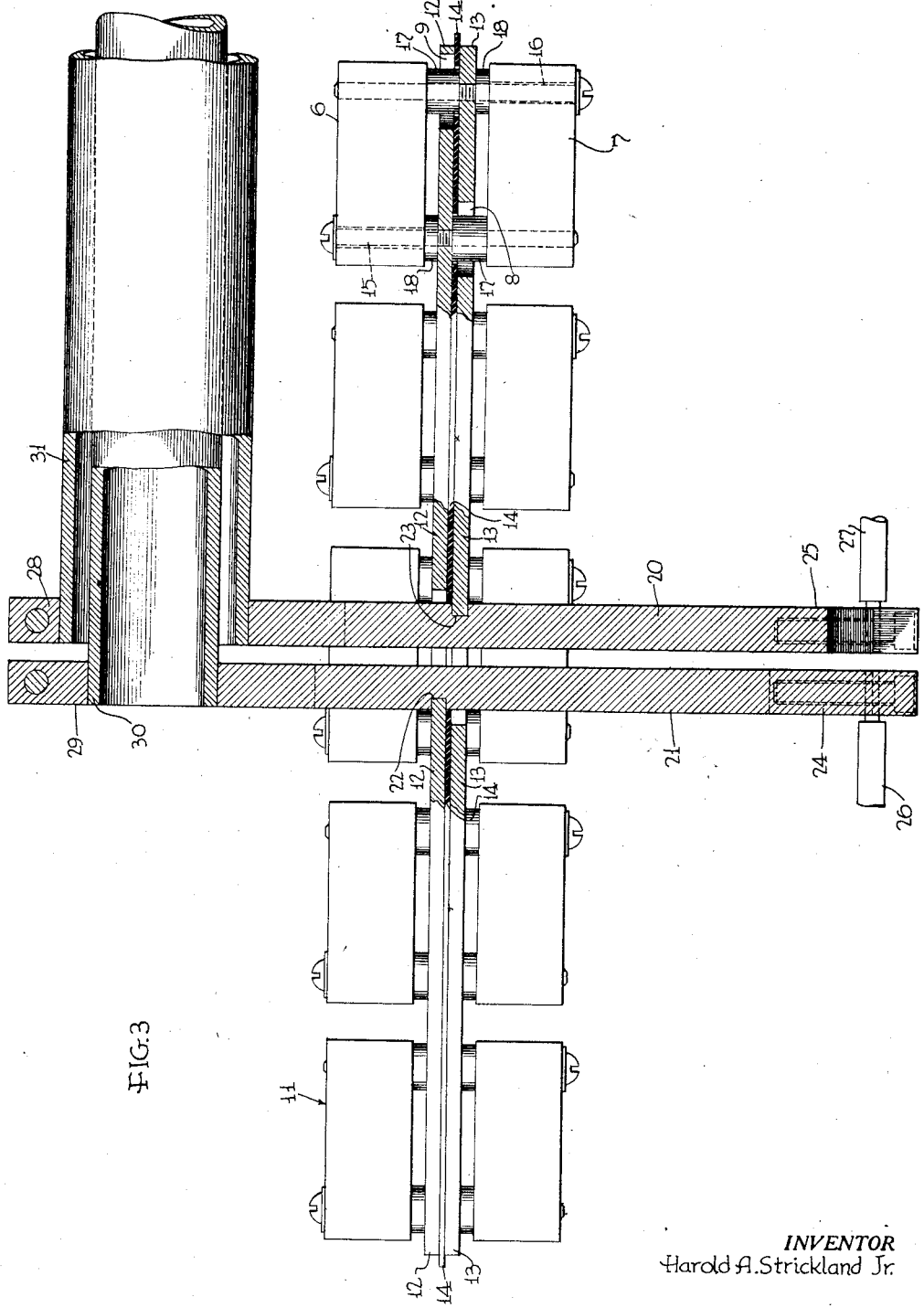
Figure 3 is an enlarged view of the capacitor block showing the mode of attachment of the capacitor elements to the conductor plates.

In the illustrated embodiment of the invention, the numeral 10 indicates generally the capacitor block, the same being formed of a plurality of individual capacitors 11, a group being formed each on one side of intervening conducting plates 12 and 13. The conducting plates 12 and 13 are in the shape of large metal sheets, preferably of copper. These sheets are separated by a thin sheet of insulation 14, the edge of which extends slightly beyond the edge of the metal plates 12 and 13 so as to prevent electrical creepage. As clearly brought out in Figure 3, any two opposite capacitors, as 6 and 7, are connected to the conductor plates 12 and 13 by common direct attachment, the same consisting in screw bolts 15 and 16. Bolt 15 passes through adjacent ends of the two capacitors 6 and 7, which have clearance holes in one end and threaded holes in the other, and is screw threaded to capacitor 7 clearing the hole in capacitor 6. The opposite ends of the capacitors 6 and 7 are similarly secured by means of the screw bolt 16, the head of which is on the side of the plates opposite from the head of bolt 15. Interposed between the capacitors and the plate to which attachment is made are tubular copper metal spacers 17 and 18, the spacers 17 having a greater length than the spacers 18 in order to maintain a parallel positioning of the capacitors with reference to the adjacent conducting plate. To permit clearance of the plate 12 about each spacer 17 an aperture 9 is formed therein. Similarly, an aperture 8 affords clearance for each spacer 17 in plate 13.

It is apparent from the construction as just described of the adjacent opposed capacitors 6 and 7 that these capacitors are connected in electric parallel relation to the conductor plates 12 and 13, and that in combination with the other pairs of capacitors a bank or block of capacitors of any desired capacitance may be obtained, depending upon the degree of multiplication of the capacitor units. The details of the individual capacitors are not set forth but it is understood that the construction of these units is conventional, including a group of thin metal conductors separated by dielectric strips in alternate formation to form electrically parallel elements of capacitance with trans-capacitor terminals 4 and 5 associated with the bolts 15 and 16.

To provide means for leading current into and out of the capacitor block the conducting plates 12 and 13 and the intervening insulation strip 14 are apertured adjacent the central section of the block to receive the rectangular bus bars 20 and 21. Attachment is made between the bus bar 20 and the projecting edge 23 of plate 13 by formation of a transverse groove in the face of the bus bar 20 in which the edge 23 is inserted and brazed. Similarly, the bus bar 21 is attached to plate 12 by insertion of the edge 22 in a transverse groove formed in the surface of the bus bar. The size of the holes formed in the conducting plates 12 and 13 is such in relation to the bus bars 20 and 21 as to bring them into relatively close proximity to each other. The bus bars 20 and 21 extend outwardly from the conducting plates 12 and 13 at right angles thereto and to the ends 24 and 25 on the side adjacent plate 13 are attached the heating coil terminals 26 and 27. To the offset ends 28 and 29 of the bus bars on the opposite side of the block are connected coaxial conductors 30 and 31, these being in the form of metal tubes with conductor 30 within conductor 31 and the ends attached to the bus bars.

The structure as hereinabove described permits reduction of resistance and inductance to an extremely small value. It is evident that because of the direct, rigid and short connection between the capacitors to the adjacent conducting plates, and because of the wide area of conducting metal in the plates 12 and 13, and further because of the substantial size of the bus bars 20 and 21, the resistance of the capacitor block unit is small. It is further apparent that because of the short straight paths between capacitors and plates, and further because of the right angle relationship of bus bars and capacitor connectors to the plates 12 and 13, and further because of the close positioning of the plates 12 and 13 and bus bars 20 and 21 and coaxial conductors 30 and 31 the inductance and inductive reactance of the circuit is greatly reduced. The close positioning of plates 12 and 13, separated as they are only by the thin insulation sheet 14, insures a maximum of proximity effect arising from the interaction of the magnetic flux flow in the adjacent sheets whereby the reactance of the circuit including the two sheets connected in series is substantially reduced when connected to an alternating current source; also, the extended flat sheet of the conductors 12 and 13 insures that the resistance due to skin effect for high frequencies is diminished to a considerable degree. Attention is directed to the multiplicity of parallel paths between the various capacitors and the plates 12 and 13, and to the facts that these paths are approximately of equal length and involve only a small degree of curvature. Since the conducting volume of the plates and bus bars 20 and 21 are relatively large in comparison with the conductors between the capacitors and plates there is substantial equality in the resistance of each capacitor circuit.

A further advantage of the sheet construction of the conductors 12 and 13 resides in the large amount of surface area in proportion to the volume of the conductors. As is well known, heat radiation is a function of the surface area and, hence, by utilizing thin sheets the heat dissipation capability of the conductors is magnified. The wide area of the conductors 12 and 13, also, lends itself to efficient cooling methods, as by air blowers.

While I have shown an embodiment of my invention which has important advantages, it is apparent that modifications may be made in the arrangement, materials and details and, hence, I do not desire to be limited in the scope of my invention other than as required by the claim hereto appended.

What is claimed is:

A support for plural electrical units comprising parallel superposed conducting plates, an insulation sheet between said plates, and means for securing on both sides of said plates a plurality of electrical units each having two terminals, said means comprising pairs of connectors extending through said plates and insulation sheet at right angles thereto, each pair connector having attachment to a plate other than that to which the other pair member is attached.

HAROLD A. STRICKLAND, Jr.

REFERENCES CITED

The following references are of record in the file of this patent:

UNITED STATES PATENTS

| Number | Name | Date |
| --- | --- | --- |
| 1,532,846 | Thorardson | Apr. 7, 1925 |
| 1,960,058 | Lynn | May 22, 1934 |
| 1,842,374 | Dubilier | Jan. 26, 1932 |
| 1,852,718 | Haefely | Apr. 5, 1932 |
| 2,334,660 | Webster | Nov. 16, 1943 |

FOREIGN PATENTS

| Number | Country | Date |
| --- | --- | --- |
| 462,460 | Great Britain | Mar. 10, 1937 |